United States Patent
Novoa Liceaga et al.

(10) Patent No.: US 11,433,834 B2
(45) Date of Patent: Sep. 6, 2022

(54) VEHICLE FRONT END STRUCTURE

(71) Applicant: Nissan North America, Inc., Franklin, TN (US)

(72) Inventors: Emilio Novoa Liceaga, Mexico City (MX); Minerva Nieto Torres, Mexico City (MX); Omar Rene Manzano Miranda, Mexico City (MX); Arturo Barrera Anaya, Mexico City (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 167 days.

(21) Appl. No.: 17/039,655

(22) Filed: Sep. 30, 2020

(65) Prior Publication Data

US 2022/0097635 A1    Mar. 31, 2022

(51) Int. Cl.
| | |
|---|---|
| *B60R 19/02* | (2006.01) |
| *B60R 19/03* | (2006.01) |
| *B60R 19/12* | (2006.01) |
| *B60R 19/18* | (2006.01) |

(52) U.S. Cl.
CPC ............ *B60R 19/023* (2013.01); *B60R 19/03* (2013.01); *B60R 19/12* (2013.01); *B60R 19/18* (2013.01); *B60R 2019/186* (2013.01); *B60R 2019/1886* (2013.01)

(58) Field of Classification Search
CPC ....... B60R 19/023; B60R 19/03; B60R 19/18; B60R 19/12; B60R 2019/1886; B60R 2019/186
See application file for complete search history.

(56) References Cited

U.S. PATENT DOCUMENTS

| | | | |
|---|---|---|---|
| 9,956,993 B1* | 5/2018 | Klop ................... | B60R 19/483 |
| 10,493,934 B2 | 12/2019 | Fernandez et al. | |
| 10,793,095 B2* | 10/2020 | Horiuchi ................ | B60R 21/00 |
| 2006/0214439 A1 | 9/2006 | Reynolds | |
| 2008/0203744 A1 | 8/2008 | Fortin | |
| 2009/0267364 A1 | 10/2009 | Crainic et al. | |
| 2010/0090499 A1 | 4/2010 | Shepard et al. | |
| 2016/0137230 A1* | 5/2016 | Taneda .................. | G01S 13/931 |
| | | | 296/193.09 |
| 2019/0161041 A1 | 5/2019 | Fernandez et al. | |
| 2020/0101913 A1 | 4/2020 | Rangel et al. | |

* cited by examiner

*Primary Examiner* — D Glenn Dayoan
*Assistant Examiner* — Melissa Ann Bonifazi
(74) *Attorney, Agent, or Firm* — Global IP Counselors, LLP (57) ABSTRACT

A vehicle front end structure includes a front bumper assembly, an overrider bracket, and a vehicle sensor. The front bumper assembly has a reinforcement bracket and a first energy absorbing member attached to forward portions of a vehicle body structure. The reinforcement bracket is located rearward of and spaced apart from a forward section of the first energy absorbing member defining a space therebetween. The first energy absorbing member further has a first lateral portion and a second lateral portion with a central gap defined therebetween. The overrider bracket is installed to the reinforcement bracket and is located within the central gap between the first lateral portion and the second lateral portion. The overrider bracket defines a pocket area with a second energy absorbing member installed within the pocket area. The vehicle sensor is supported to vehicle body structure and positioned above the second energy absorbing member.

18 Claims, 7 Drawing Sheets

VEHICLE FRONT END STRUCTURE

BACKGROUND

Field of the Invention

The present invention generally relates to a vehicle front end structure. More specifically, the present invention relates to vehicle front end structure having a bumper assembly that includes a first energy absorbing member that is hollow and a second energy absorbing member made of a resilient energy absorbing foam material that is centered in a gap in the first energy absorbing member.

Background Information

Vehicle structures, such as front end structures and their bumper assemblies, are continuously being re-designed for improved safety and improved response to impact events.

SUMMARY

One object of the present disclosure is to provide a vehicle front end structure that has a bumper assembly with a first energy absorbing member that is hollow and a second energy absorbing member made of a resilient energy absorbing foam material centered in a gap in the first energy absorbing member In view of the state of the known technology, one aspect of the present disclosure is to provide a vehicle front end structure with a front bumper assembly with a first energy absorbing member, an overrider bracket, a second energy absorbing member and a vehicle sensor. The front bumper assembly has a reinforcement bracket and the first energy absorbing member attached to forward portions of a vehicle body structure. The reinforcement bracket is located rearward of and spaced apart from a forward section of the first energy absorbing member defining a space therebetween. The first energy absorbing member further has a first lateral portion and a second lateral portion with a central gap defined therebetween. The overrider bracket is installed to the reinforcement bracket and is located within the central gap between the first lateral portion and the second lateral portion. The overrider bracket defines a pocket area. The second energy absorbing member is installed within the pocket area of the overrider bracket. The vehicle sensor supported to vehicle body structure and positioned above the second energy absorbing member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
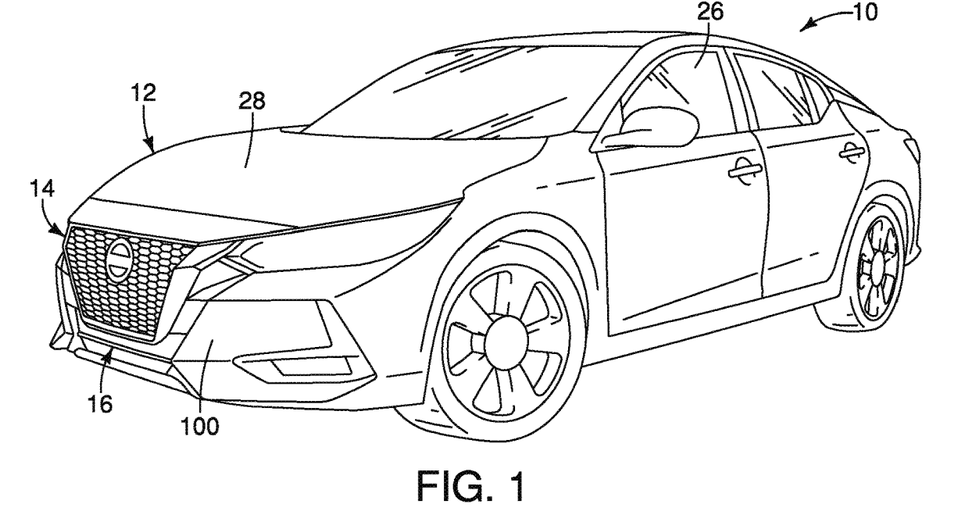
FIG. 1 is a perspective view of a vehicle showing portions of a vehicle body structure and a vehicle front end assembly in accordance with an exemplary embodiment.
Figure 2:
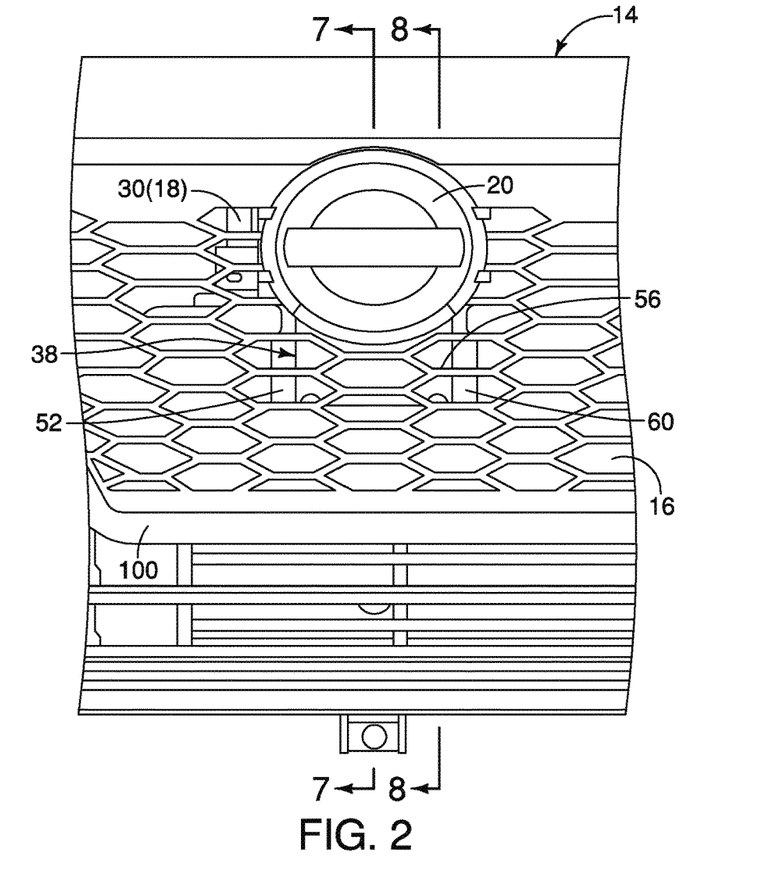
FIG. 2 is a front view of the vehicle front end assembly showing a bumper fascia that includes a grill, with portions of the vehicle bumper assembly visible through openings in the grill in accordance with the exemplary embodiment.

Referring initially to FIGS. 1 and 2, a vehicle 10 having a vehicle body structure 12 with a vehicle front end structure 14 that includes a front bumper assembly 16 is illustrated in accordance with a first embodiment.

Figure 3:
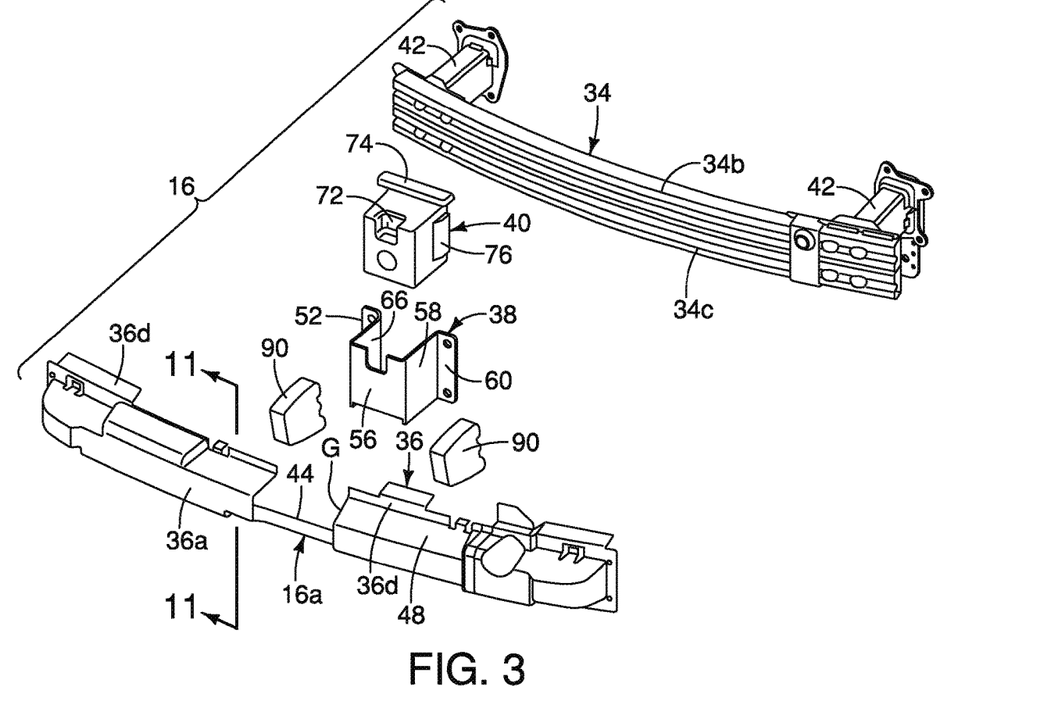
FIG. 3 is an exploded perspective view of the bumper assembly with the grill and fascia removed showing elements of the bumper assembly including a reinforcement bracket, a first energy absorbing member, an overrider bracket and a second energy absorbing member in accordance with the exemplary embodiment.
Figure 4:
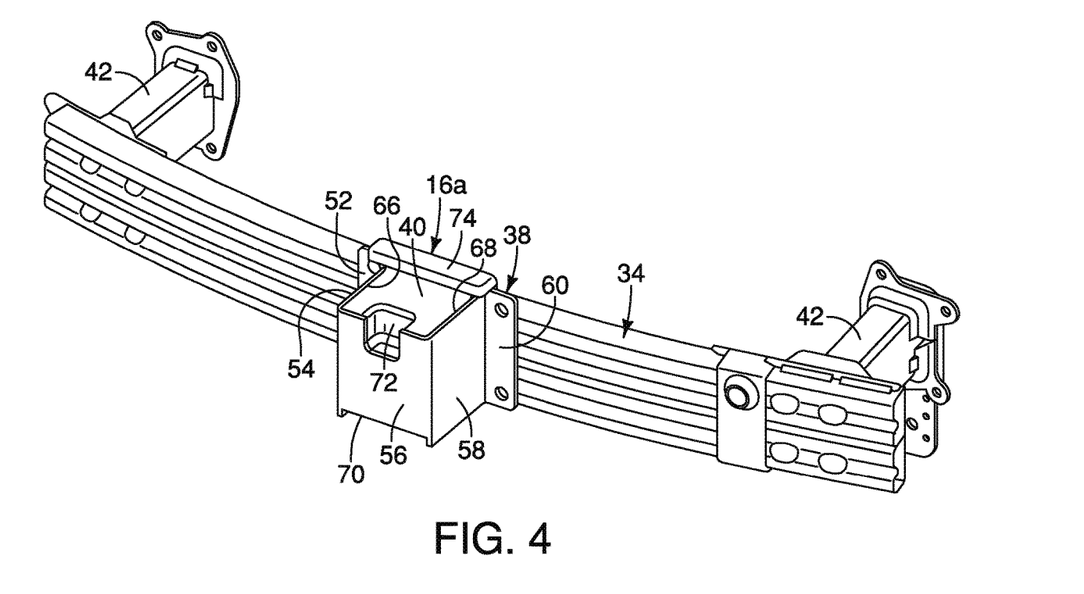
FIG. 4 is a perspective view of the bumper assembled partially assembled with the first energy absorbing member removed showing the overrider bracket and the second energy absorbing member installed to a central area of the reinforcement bracket in accordance with the exemplary embodiment.
Figure 6:
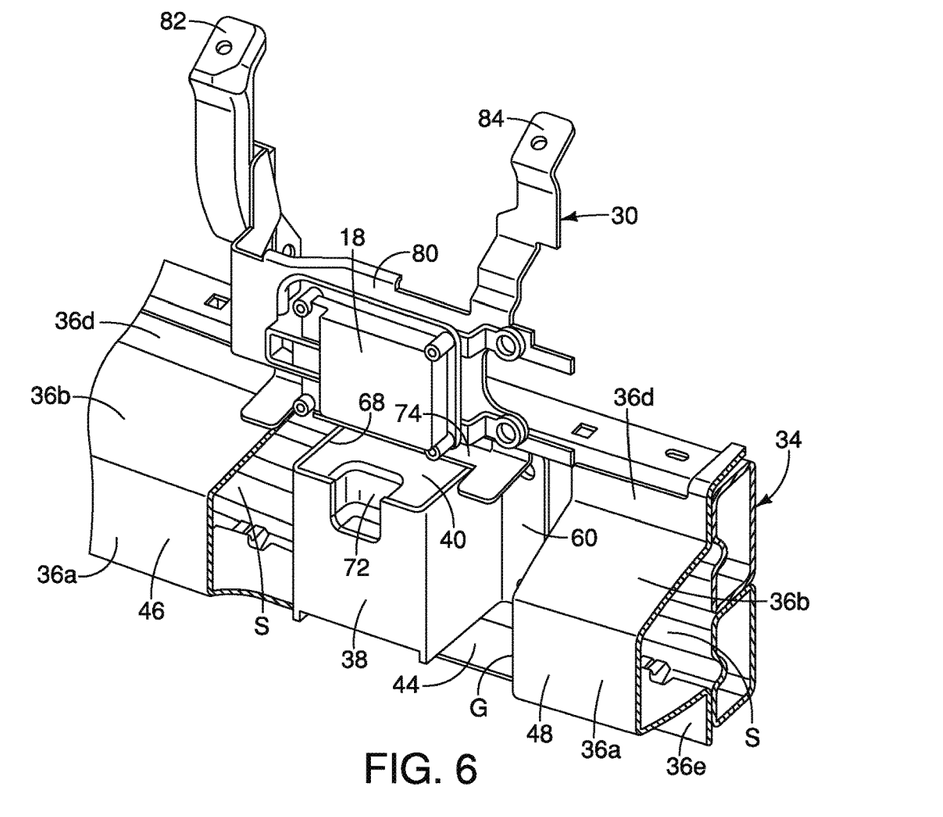
FIG. 6 is a perspective view of a central portion of the bumper assembly showing the second energy absorbing member installed within the overrider bracket located within a gap defined between first and second lateral portions of the first energy absorbing member, with a vehicle sensor and sensor supporting bracket installed above the overrider bracket and the second energy absorbing member in accordance with the exemplary embodiment.

As shown in FIGS. 3, 4 and 6, the front bumper assembly 16 includes a central section 16a that is positioned and dimensioned to protect a sensor 18 (also referred to as a vehicle sensor 18), as is described in greater detail below. The sensor 18 is located behind a vehicle emblem 20, as shown in FIG. 2. The vehicle emblem 20 is centered relative to and attached to a front grill 22 of the vehicle 10, as is also shown in FIGS. 1 and 2.

The vehicle body structure 14 includes a pair of front side members 24 that extend forward from a dashwall (not shown) that separates a passenger compartment 26 from an engine compartment 28 in a conventional manner. The front side members 24 are structural elements of the vehicle body structure 14 and define lateral forward portions of the vehicle body structure 14. Since front side members of vehicle body structures are conventional structural elements, further description is omitted for the sake of brevity.

The front end structure 14 (also referred to as the vehicle front end structure 14) includes the front bumper assembly 16, a sensor supporting bracket 30 and the sensor 18, which are all described in greater detail below.

The front bumper assembly 16 includes a reinforcement bracket 34, a first energy absorbing member 36, an overrider bracket 38 and a second energy absorbing member 40.

Figure 7:
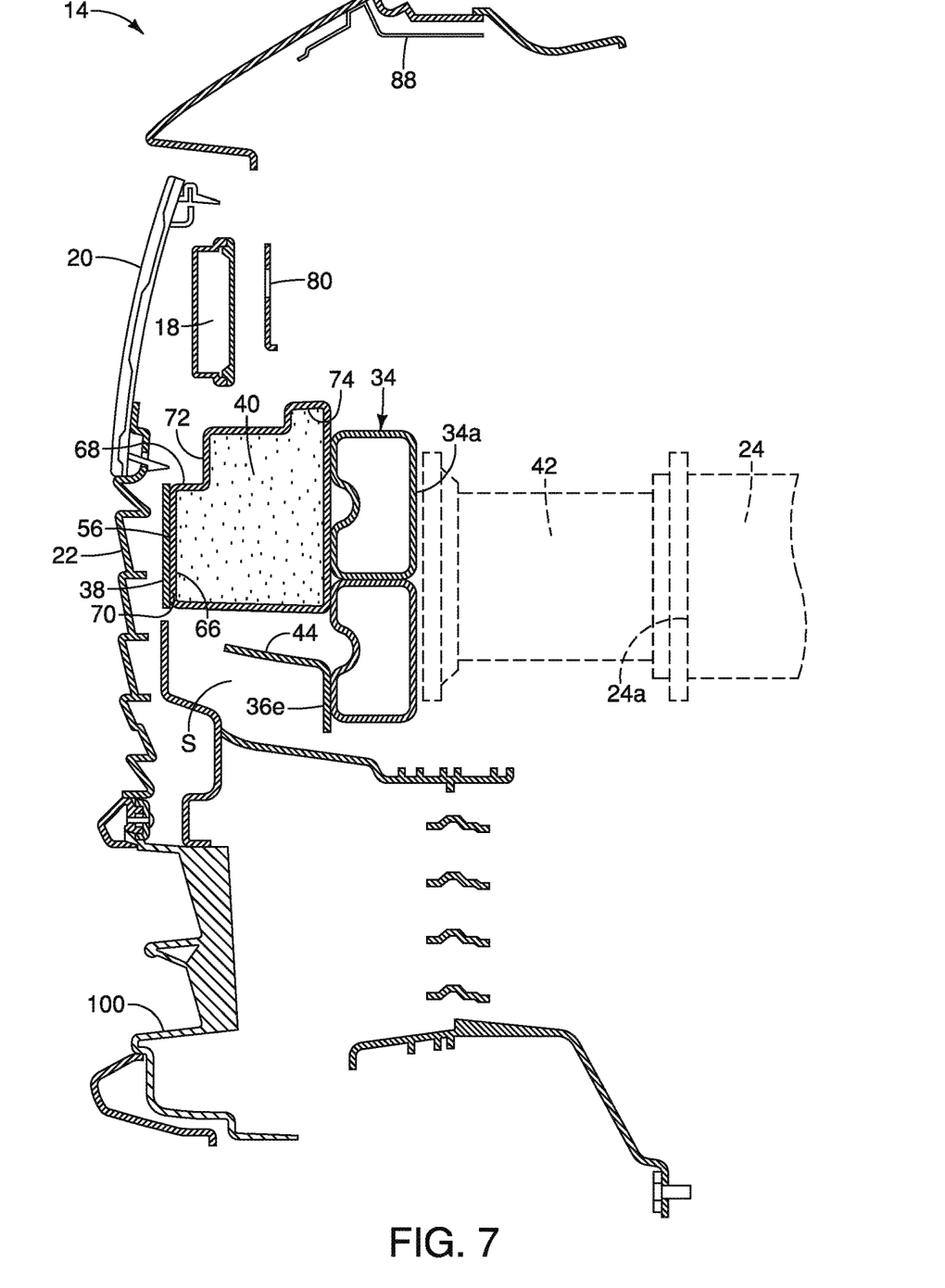
FIG. 7 is a cross-section of the front end assembly of the vehicle taken along the line 7-7 in FIG. 2, in accordance with the exemplary embodiment.
Figure 8:
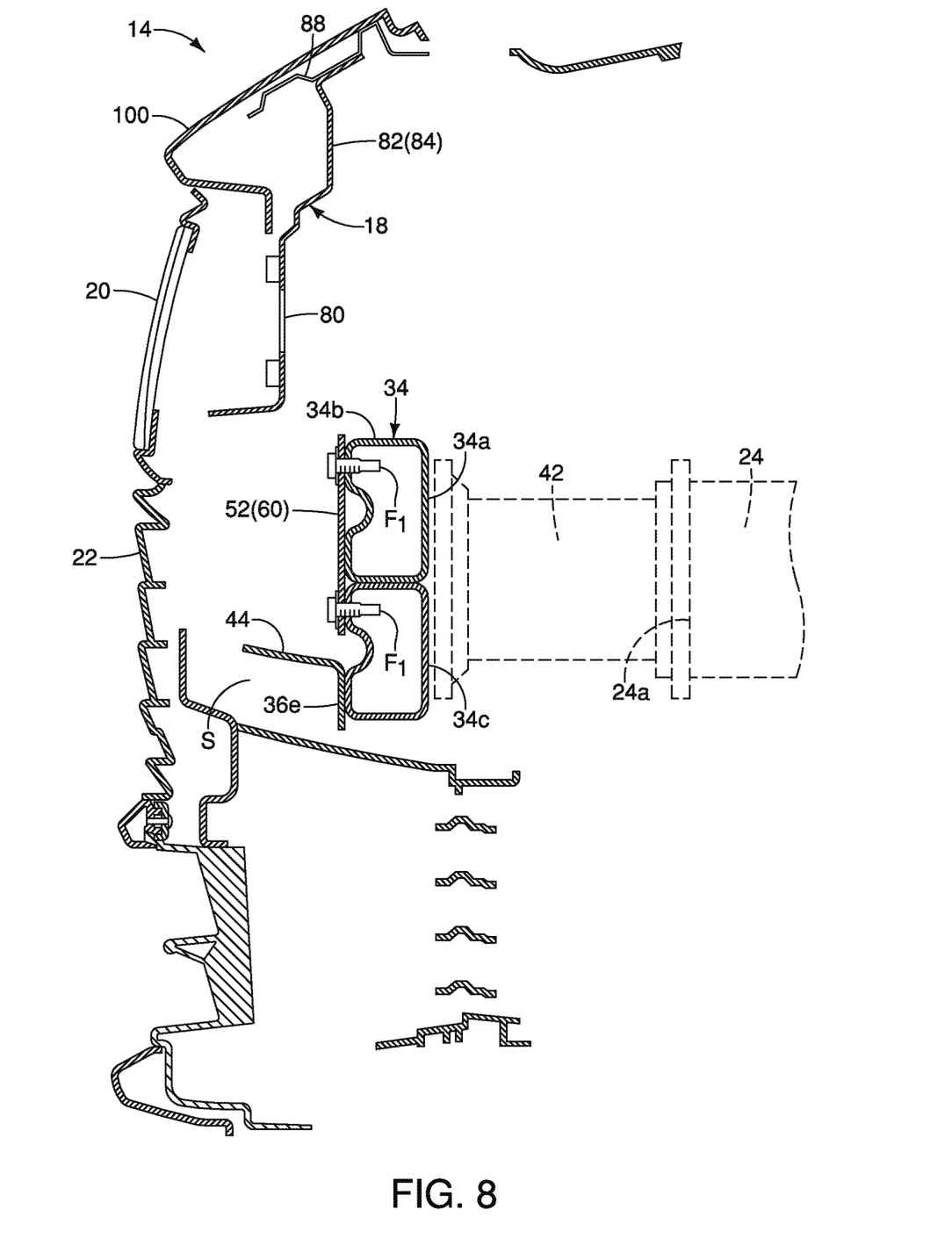
FIG. 8 is another cross-section of the front end assembly of the vehicle taken along the line 8-8 in FIG. 2, in accordance with the exemplary embodiment.
Figure 9:
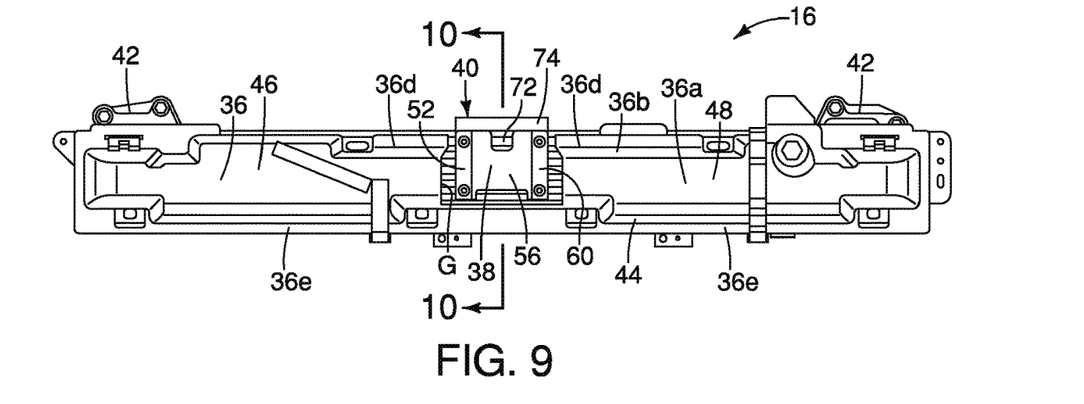
FIG. 9 is a front view of the bumper assembly showing the first energy absorbing member, the overrider bracket and the second energy absorbing member installed within the gap of the first energy absorbing member and attached to the reinforcement bracket in accordance with the exemplary embodiment.
Figure 10:
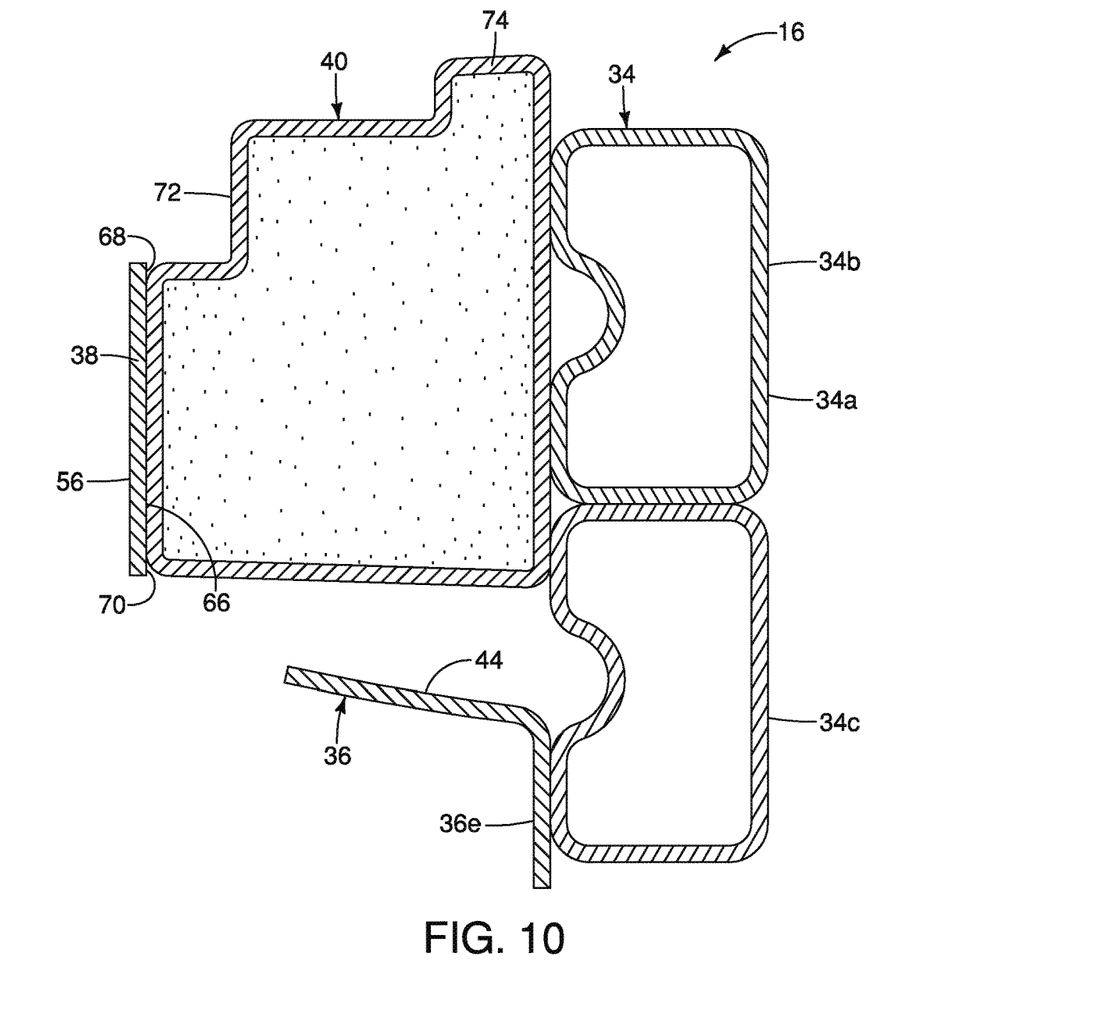
FIG. 10 is a cross-section of the bumper assembly taken along the line 10-10 in FIG. 9, in accordance with the exemplary embodiment.

The reinforcement bracket 34 is preferably made of steel, a metal alloy or a composite material, such as resin and fiberglass material, other lightweight impact resistant material or combinations thereof. The reinforcement bracket 34 includes a pair of stays 42 that are attached to a rearward facing surface 34a of the reinforcement bracket 34 at opposite lateral ends thereof, as shown in FIGS. 3-4 and 7-8. As shown in FIGS. 7-8, the pair of stays are attached to forward facing surfaces 24a of the front side members 24 of the vehicle body structure 12.

Hence as shown in FIGS. 3-4 and 7-8, the reinforcement bracket 34 is located forward of and spaced apart from the front side member 24 (via the stays 42). Further, the reinforcement bracket 34 is located rearward of and spaced apart from a forward section 36a of the first energy absorbing member 36 defining a space S therebetween, as shown in FIGS. 4, 7 and 8.

The reinforcement bracket 34 can be a single element or member. Alternatively, the reinforcement bracket 34 can include or can be formed from an upper bracket 34b and a lower bracket 34c that contact one another, are rigidly attached to one another via mechanical fasteners (not shown) or are welded together to form a single rigid member. Further, the upper bracket 34b and the lower bracket 34c are vertically aligned with one another.

The first energy absorbing member 36 can be made of any of a variety of materials, such as metals, alloys or resin or polymer materials such as polypropylene. The first energy absorbing member 36 includes a lower wall 44 that extends from one vehicle lateral end of the bumper assembly 16 to the opposite lateral end of the bumper assembly 16. The first energy absorbing member 36 further includes a first lateral portion 46 and a second lateral portion 48 with a central gap G defined therebetween. The lower wall 44 extends along the first lateral portion 46, the central gap G and the second lateral portion 48.

Figure 11:
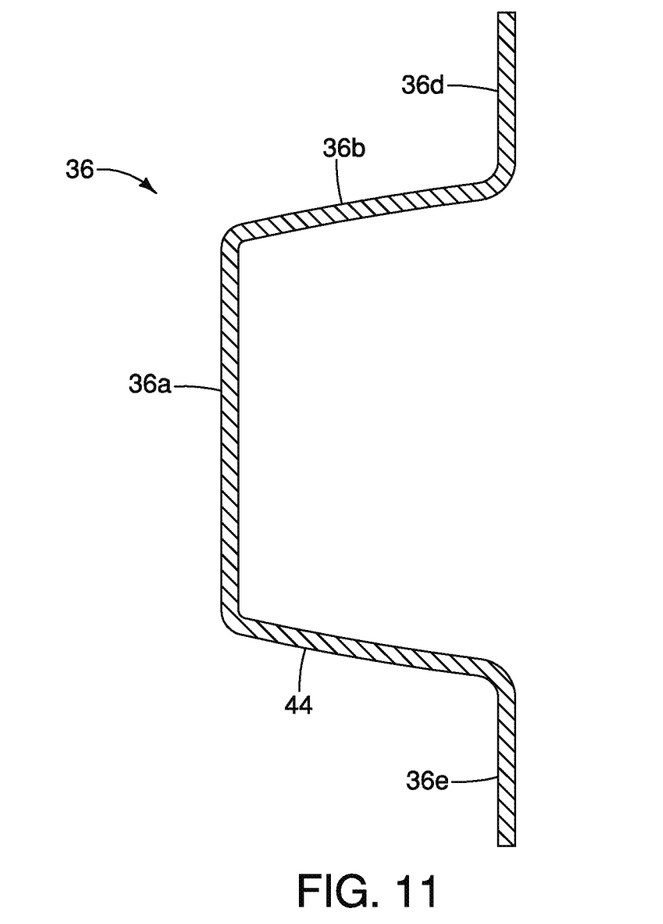
FIG. 11 is a cross-section of the first energy absorbing member of the bumper assembly taken along the line 11-11 in FIG. 3, in accordance with the exemplary embodiment.
Figure 12:
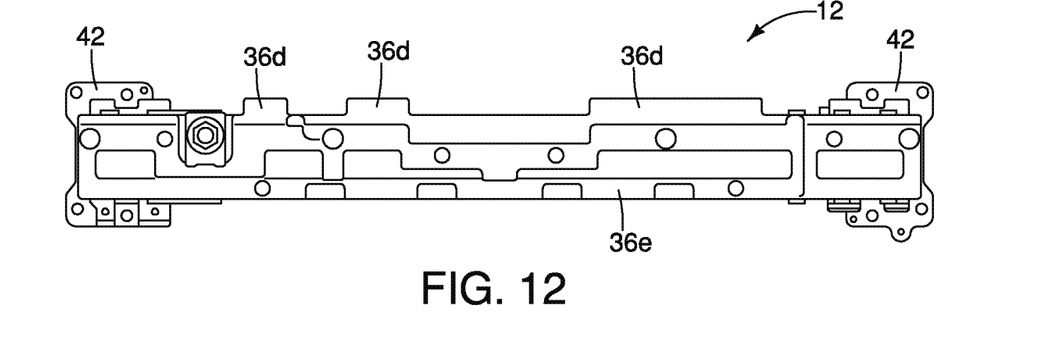
FIG. 12 is a front view of the bumper assembly with the overrider bracket and the second energy absorbing member removed in accordance with the exemplary embodiment.

As shown in FIG. 11, the first lateral portion 46 of the first energy absorbing member 36 has an overall C-shape as viewed in cross-section. The C-shape is defined by the forward section 36a, the lower wall 44, and upper section 36b. As described above, the lower wall 44 is continuous along the first lateral portion 46, the second lateral portion 48 and the central gap G. However, the forward section 36a and the upper section 36b are absent in the central gap G.

The first energy absorbing member 36 further includes upper flanges 36d and lower flanges 36e, as shown in FIGS. 3, 5-6 and 13. The first energy absorbing member 36 is attached to the reinforcement bracket 34 via the upper flanges 36d and the lower flanges 36e. Specifically, the upper flanges 36d and the lower flanges 36e can be attached to the reinforcement bracket 34 using adhesives, mechanical fasteners, or other mechanical attachment structures.

As shown in FIGS. 3-7, the overrider bracket 38 is installed to a forward side of the reinforcement bracket 34 and with the first energy absorbing member 36 installed to the reinforcement bracket 34, the overrider bracket 38 is located within the central gap G. However, the overrider bracket 38 has a non-contacting relationship with each of the first lateral portion 46 and the second lateral portion 48 of the first energy absorbing member 46. Specifically, the overrider bracket 38 is spaced apart from the first lateral portion 46 and the second lateral portion 48, and, is located above the lower wall 44.

The overrider bracket 38 includes a first side flange 52, a first side wall 54, a forward end wall 56, a second side wall 58 and a second side flange 60. The first side flange 52 and the second side flange 60 are rigidly attached to the reinforcement bracket 34 by mechanical fasteners $F_1$, as shown in FIG. 8. Alternatively, the first side flange 52 and the second side flange 60 can be welded to the reinforcement bracket 34.

The first side wall 54, the forward end wall 56, the second side wall 58 and the adjacent section of the reinforcement bracket 34 define a pocket area 66. Further, upper ends of each of the first side wall 54, the forward end wall 56 and the second side wall 58 define an opening 68 open to the pocket area 66. Lower ends of each of the first side wall 54, the forward end wall 56 and the second side wall 58 define a lower opening 70 that is also open to the pocket area 66.

As shown in FIGS. 3-7 and 10, the second energy absorbing member 40 is dimensioned to fit into the pocket area 66. More specifically, the second energy absorbing member 40, the opening 68 and the pocket area 66 are dimensioned with predetermined tolerances such that the second energy absorbing member 40 is fitted through the opening 68 and into the pocket area 66 and snuggly retained therein.

The lower wall 44 of the first energy absorbing member 36 extends below the lower opening 70 of the pocket area 66 at least partially covers a portion of the lower opening 70 of the pocket area 66. The overrider bracket 38 and the second energy absorbing member 40 above and spaced apart from the lower wall 44, as shown in FIG. 7.

The second energy absorbing member 40 is basically a block of foam material that includes a recessed area 72, an upper movement limiting bar 74 and a retention projection 76. In the depicted embodiment the second energy absorbing member 40 is made of, for example, expanded polypropylene (EPP), but can be any suitable impact absorbing material. The recessed area 72 is a depression that is dimensioned to accommodate a fastener (not shown) that retains the emblem 20 to the front grill 22. In other words, the recessed area 72 can be omitted or re-positioned depending upon the shape of the front grill 22 and/or the shape, orientation, fastening structure and location of the vehicle emblem 20. The recessed area 72 is not required for the purpose and function of the second energy absorbing member 40, but rather is provided for the sake of an unrelated structure.

The upper movement limiting bar 74 is unitarily formed with the remainder of the second energy absorbing member 40 but can alternatively be added onto via a mechanical fastening structure or adhesive to the block portion of the second energy absorbing member 40. The upper movement limiting bar 74 is longer than a corresponding width of the opening 68 and pocket area 66 of the overrider bracket 38. As a result, when the block portion of the second energy absorbing member 40 is installed into the pocket area 66 of the overrider bracket 38, the upper movement limiting bar 74 prevents the second energy absorbing member 40 from moving downward from the pocket area 66 toward the lower wall 44 of the first energy absorbing member 36. In other words, the upper movement limiting bar 74 defines a stopper that prevents further downward movement of the second energy absorbing member 40 defining and maintaining the second energy absorbing member 40 is in its intended location.

The retention projection 76 is a bump or convex area of one surface of the second energy absorbing member 40, as shown in FIG. 3. The retention projection 76 projects from the surrounding surface only a very small distance of, for example, between $1/32^{nd}$ of an inch to as much as $1/8^{th}$ of an inch. The overall thickness of the second energy absorbing member 40 is greater with the retention projection 76 that the overall corresponding width of the opening 68 and the pocket area 66. Hence, when the second energy absorbing member 40 is installed into the pocket area 66, a predetermined level of force is required to slightly compress the retention projection 76 so that the second energy absorbing member 40 slides into the pocket area 66. The retention projection 76 thereafter provides a force-fit between the interior surfaces of the pocket area 66 and the second energy absorbing member 40. Friction is generated in order to remove the second energy absorbing member 40 from the pocket area 66.

As shown in FIG. 6, the sensor supporting bracket 30 includes a backing plate 80, a first upper portion 82 and a second upper portion 84. The backing plate 80 (also referred to as a lower portion) is shaped, dimensioned and arranged to receive the sensor 18. Specifically, the backing plate 80 includes openings that receive fasteners (not shown) that retain the sensor 18 to the backing plate 80. The first upper portion 82 and the second upper portion 84 are rigid elongated strap-like members that extend upward from opposite sides of the backing plate 80. The first upper portion 82 and the second upper portion 84 are attached to a forward structural element 88 of the vehicle body structure 12. The forward structural element 88 laterally from side to side of the vehicle 10 above a radiator (not shown) of the vehicle 10 and above the grill 22.

The sensor support bracket 30 (and the sensor 18) are attached to the vehicle body structure 12 and are not directly attached to either of the front bumper assembly 16, the overrider bracket 38 and the second energy absorbing member 40. Further, the sensor support bracket 30 (and the sensor 18) are spaced apart and above the front bumper assembly 16, the overrider bracket 38 and the second energy absorbing member 40, as shown in FIGS. 7 and 8. In other words, the sensor supporting bracket 30 is shaped and dimensioned such that the vehicle sensor 18 is positioned vertically higher that an uppermost surface of the reinforcement bracket 34 and is approximately centered above the second energy absorbing member 40.

The sensor supporting bracket 30 is shaped and dimensioned such that the vehicle sensor 18 is positioned: 1) rearward of a forward facing surface of the second energy absorbing member 40; forward of a rearward facing surface of the second energy absorbing member 40 and vertically higher that an uppermost surface of the reinforcement bracket 34.

In the depicted embodiment, the sensor 18 is configured to detect presence and distance between the vehicle sensor 18 and a vehicle forward of the vehicle sensor 18. The sensor 18 is attached to an electronic controller (not shown) which processes signals from the sensor 18. The electronic controller processes signals received from the sensor 18 and provides information to the vehicle operator with respect to location of the vehicle forward of the vehicle sensor 18 in a conventional manner.

Figure 5:
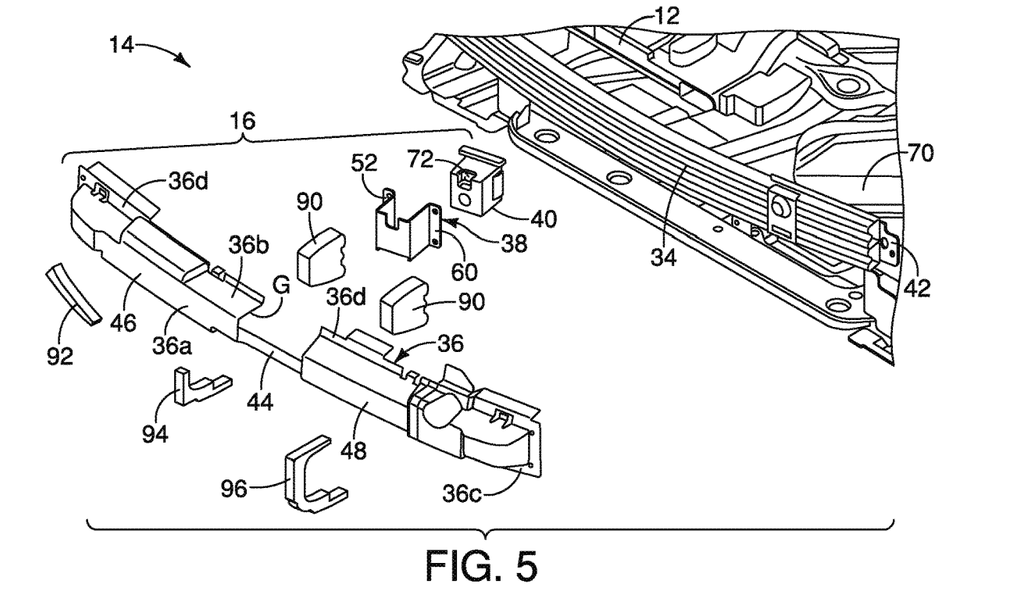
FIG. 5 is an exploded perspective view of the vehicle front end assembly with the grill and fascia removed showing elements of the bumper assembly including the reinforcement bracket, the first energy absorbing member, the overrider bracket, the second energy absorbing member and a front area of the vehicle body structure in accordance with the exemplary embodiment.

As shown in FIGS. 3 and 5, during assembly of the front bumper assembly 16, the impact absorbing blocks 90 are fit within the space S of the first energy absorbing member 36 on opposite sides of the gap G and spaced apart from the gap G. The first energy absorbing member 36 is otherwise hollow throughout the space S. Further as shown in FIG. 5, elastic spacers 92, 94 and 96 are fitted to forward areas of the first energy absorbing member 36 and act as spacers between the first energy absorbing member 36 and a fascia 100. The fascia 100 is made of an elastic and resilient polymer material that, like the first energy absorbing member 36, also absorb impact energy and return to its original shape after low speed impacts. Since fascia members are conventional vehicle elements, further description is omitted for the sake of brevity.

During a head-on impact event at speeds below, for example, 25 mph, impact energy is initially and primarily absorbed by the overrider bracket 38 and the second energy absorbing member 40, thereby preventing or at least reducing deformation or damage to any adjacent structures, including the sensor 18. For impact events that are at low speeds (below, for example, 25 mph) and slightly off-center, the first energy absorbing member 36, the overrider bracket 38 and the second energy absorbing member 40 absorb the low impact energy (impact forces), again, preventing or at least reducing deformation or damage to any adjacent structures, including the sensor 18.

The various vehicle body structures and elements of the vehicle 10 (other than the above described features and elements of the front bumper assembly 16) are conventional components that are well known in the art. Since these features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle front end structure. Accordingly, these terms, as utilized to describe the present invention should be interpreted relative to a vehicle equipped with the vehicle front end structure.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front end structure, comprising:
    a front bumper assembly having a reinforcement bracket and a first energy absorbing member attached to forward portions of a vehicle body structure, the reinforcement bracket being located rearward of and spaced apart from a forward section of the first energy absorbing member defining a space therebetween, the first energy absorbing member further having a first lateral portion and a second lateral portion with a central gap defined therebetween;
    an overrider bracket installed to the reinforcement bracket and located within the central gap between the first lateral portion and the second lateral portion, the overrider bracket defining a pocket area;
    a second energy absorbing member installed within the pocket area of the overrider bracket; and
    a vehicle sensor supported to vehicle body structure and positioned above the second energy absorbing member.

2. The vehicle front end structure according to claim 1, further comprising
    a sensor supporting bracket having a lower portion attached to the vehicle sensor and an upper portion that is attached to the vehicle body structure.

3. The vehicle front end structure according to claim 2, wherein
    the sensor supporting bracket is shaped and dimensioned such that the vehicle sensor is positioned vertically higher that an uppermost surface of the reinforcement bracket.

4. The vehicle front end structure according to claim 2, wherein
    the sensor supporting bracket is shaped and dimensioned such that the vehicle sensor is positioned rearward of a forward facing surface of the second energy absorbing member.

5. The vehicle front end structure according to claim 2, wherein
    the sensor supporting bracket is shaped and dimensioned such that the vehicle sensor is positioned forward of a rearward facing surface of the second energy absorbing member.

6. The vehicle front end structure according to claim 2, wherein
    the sensor supporting bracket is shaped and dimensioned such that the vehicle sensor is positioned rearward of a forward facing surface of the second energy absorbing member, forward of a rearward facing surface of the second energy absorbing member and vertically higher that an uppermost surface of the reinforcement bracket.

7. The vehicle front end structure according to claim 1, wherein
    the vehicle sensor is configured to detect presence and distance between the vehicle sensor and a vehicle forward of the vehicle sensor.

8. The vehicle front end structure according to claim 1, wherein
    the overrider bracket has a non-contacting relationship with each of the first lateral portion and the second lateral portion of the first energy absorbing member being spaced apart therefrom.

9. The vehicle front end structure according to claim 1, wherein
    the forward portions of the vehicle body structure are defined by front side members of the vehicle body structure.

10. The vehicle front end structure according to claim 9, wherein
    the reinforcement bracket includes a pair of stays that are attached to a rearward facing surface of the reinforcement bracket at opposite lateral ends thereof, and, the pair of stays are attached to forward facing surfaces of the front side member of the vehicle body structure.

11. The vehicle front end structure according to claim 1, wherein
    the reinforcement bracket includes an upper bracket and a lower bracket that contact one another, are rigidly attached to one another and are vertically aligned with one another.

12. The vehicle front end structure according to claim 1, wherein
    the overrider bracket includes a first side flange, a first side wall, a forward end wall, a second side wall and a second side flange, the first side flange and the second side flange being rigidly attached to the reinforcement bracket.

13. The vehicle front end structure according to claim 12, wherein
    the first side wall, the forward end wall and the second side wall define the pocket area.

14. The vehicle front end structure according to claim 13, wherein
    upper ends of each of the first side wall, the forward end wall and the second side wall define an opening to the pocket area.

15. The vehicle front end structure according to claim 14, wherein
    the second energy absorbing member, the opening and the pocket area are dimensioned with predetermined tolerances such that the second energy absorbing member is fitted through the opening and into the pocket area and snuggly retained therein.

16. The vehicle front end structure according to claim 14, wherein lower ends of each of the first side wall, the forward end wall and the second side wall define a lower opening to the pocket area, and the first energy absorbing member includes a lower wall that extends along the first lateral portion, the central gap and the second lateral portion such that the lower wall covers at least a portion of the lower opening of the pocket area.

17. The vehicle front end structure according to claim 1, wherein the first energy absorbing member includes a lower wall that extends along the first lateral portion, the central gap and the second lateral portion such that the lower wall covers at least a lower portion of the pocket area.

18. The vehicle front end structure according to claim 1, wherein the second energy absorbing member is a foam block that is dimensioned to fit snuggly within the pocket area of the overrider bracket.

* * * * *